(12) United States Patent
Miura et al.

(10) Patent No.: US 6,779,763 B2
(45) Date of Patent: Aug. 24, 2004

(54) CLAMP FOR HOLDING ELONGATED ARTICLE

(75) Inventors: Hideya Miura, Toyoake (JP); Yasuaki Kawakami, Anjo (JP)

(73) Assignees: NIFCO Inc., Yokohama (JP); VTEC Co., Ltd., Anjyo (JP)

( * ) Notice: Subject to any disclaimer, the term of this patent is extended or adjusted under 35 U.S.C. 154(b) by 43 days.

(21) Appl. No.: 10/426,831

(22) Filed: May 1, 2003

(65) Prior Publication Data

US 2004/0007648 A1 Jan. 15, 2004

(30) Foreign Application Priority Data

Jul. 12, 2002 (JP) ........................................ 2002-203607

(51) Int. Cl.[7] .............................. F16B 15/00; F16L 3/08
(52) U.S. Cl. ........................ 248/71; 248/68.1; 248/74.2
(58) Field of Search .......................... 248/71, 65, 67.5, 248/68.1, 74.1, 74.2, 74.5

(56) References Cited

U.S. PATENT DOCUMENTS

| | | | | |
|---|---|---|---|---|
| 4,437,633 A | * | 3/1984 | Andre | 248/68.1 |
| 4,840,333 A | * | 6/1989 | Nakayama | 248/68.1 |
| 4,840,334 A | * | 6/1989 | Kikuchi | 248/73 |
| 5,184,794 A | | 2/1993 | Saito | |
| 5,460,342 A | * | 10/1995 | Dore et al. | 248/74.2 |
| 5,947,426 A | * | 9/1999 | Kraus | 248/74.2 |
| 6,371,419 B1 | * | 4/2002 | Ohnuki | 248/74.2 |
| 6,450,459 B2 | * | 9/2002 | Nakanishi | 248/68.1 |

FOREIGN PATENT DOCUMENTS

| | | | |
|---|---|---|---|
| DE | 1 903 060 | | 7/1969 |
| DE | 3440995 A | * | 5/1986 |
| DE | 87 09 686 | | 10/1987 |
| DE | 92 02 734 | | 5/1992 |
| EP | 0088203 A1 | * | 9/1983 |
| EP | 0 597 718 | | 5/1994 |
| FR | 2 577 649 | | 8/1986 |
| JP | 2001221374 A | * | 8/2001 |
| JP | 2002005338 A | * | 1/2002 |
| JP | 2002005340 A | * | 1/2002 |

\* cited by examiner

Primary Examiner—Anita M. King
(74) Attorney, Agent, or Firm—Kanesaka & Takeuchi (57) ABSTRACT

A clamp for holding an elongated article includes at least one clamp portion having an insertion concave portion for receiving the elongated article and at least one elastic stop member. The insertion concave portion has a pair of sidewalls along a longitudinal direction of the elongated article to be inserted. The elastic stop member has an upper end integrally joined to an upper portion of one sidewall constituting the insertion concave portion, and projects diagonally downward toward a bottom of the insertion concave portion. The clamp portion holds the elongated article such that a lower end of the elastic stop member elastically holds the elongated article at an insertion position.

9 Claims, 7 Drawing Sheets

CLAMP FOR HOLDING ELONGATED ARTICLE

BACKGROUND OF THE INVENTION AND RELATED ART STATEMENT

The invention relates to an improvement of a clamp for holding an elongated article having a linear shape, a bar shape or a tubular shape at an intermediate portion thereof.

Conventionally, a clamp for holding an elongated article includes an insertion concave portion for receiving the elongated article and elastic stop members projecting toward a bottom of the insertion concave portion. The elastic stop members hold the elongated article at lower ends of the elastic stop members with elastic force, as the elongated article is inserted in the insertion concave portion.

In the clamp of this type, it is required to easily insert the elongated article into the insertion concave portion (small insertion force), and to hardly extract the elongated article from the insertion concave portion (large extraction force).

When the elastic stop member has a small dimension along a longitudinal direction of the elongated article, the insertion force can be reduced. However, since the lower end of the elastic stop member contacting the elongated article becomes shorter, it is difficult to increase the extraction force.

In a case that the elastic stop member is divided, the insertion force can be reduced, and, at the same time, a whole length of the lower ends of the elastic stop members (a total length of the lower ends of the respective divided elastic stop members) contacting the elongated article can be made longer. In this case, the total length of the lower ends essentially becomes shorter due to a space between the adjacent elastic stop members as compared to a non-divided elastic stop member. In this case, however, the respective divided elastic stop members need to have uniform rigidity. Otherwise, it is difficult to hold the elongated article stably.

In view of the above problems, the present invention has been made, and an object of the invention is to provide a clamp in which a lower end of an elastic stop member for holding the elongated article has a sufficient length, while an elongated article is inserted into the clamp portion with a minimum force.

Further objects and advantages of the invention will be apparent from the following description of the invention.

SUMMARY OF THE INVENTION

In order to attain the above object, according to the first aspect of the invention, a clamp for holding an elongated article includes at least one clamp portion having an insertion concave portion for receiving the elongated article and at least one elastic stop member. The insertion concave portion has a pair of sidewalls along a longitudinal direction of the elongated article to be inserted. The elastic stop member has an upper end integrally joined to an upper portion of the sidewall constituting the insertion concave portion, and projects diagonally downward toward a bottom of the insertion concave portion. The clamp portion holds the elongated article such that a lower end, of the elastic stop member elastically holds the elongated article at an insertion position under the lower end of the elastic stop member.

Further, at least one space is formed at a joining portion of the upper end of the elastic stop member and the sidewall, so that a total length of the joining portion as a bending center of the elastic stop member along the longitudinal direction of the elongated article becomes smaller than a total length of the lower end of the elastic stop member along the longitudinal direction of the elongated article.

With the structure described above, it is easy to bend the elastic stop member when the elongated article is inserted into the insertion concave portion. At the same time, in the state where the elongated article is completely inserted into the insertion concave portion and the elastic stop member is repelled so that the elongated article is held by the lower end thereof, the lower end of the elastic stop member has a long contact length relative to the elongated article. In other words, in the clamp of the invention, the elongated article can be held with a greater force while it is possible to insert the elongated article into the clamp portion with a smaller force.

According to the second aspect of the invention, the clamp for holding the elongated article according to the first aspect includes an attaching portion with respect to an object to be attached.

With the structure described above, the clamp is attached to the object using the attaching portion while the clamp portion holds the elongated article so that the elongated article can be attached to the object.

According to the third aspect of the invention, the clamp for holding the elongated article according to the first aspect includes more than two clamp portions disposed in parallel.

With the structure described above, the clamp can hold more than two elongated articles in a state that the elongated articles are bundled. Also, the respective elongated articles can be positioned at predetermined positions relative to each other.

According to the fourth aspect of the invention, in the clamp for holding the elongated article according to any one of the first to third aspects, a plurality of the elastic stop members is integrated with both of the sidewalls. Further, at lease one space is formed at a joining portion between at least one of the pair of the sidewalls and the upper end of the elastic stop member.

With the structure described above, it is easy to bend the elastic stop members due to the space when the elongated article is inserted into the insertion concave portion, resulting in a smaller insertion force. At the same time, when the elongated article is completely inserted into the insertion concave portion, the lower ends of the elastic stop members hold the elongated article securely.

According to the fifth aspect, in the clamp for holding an elongated article according to any one of the first to fourth aspects, more than two elastic stop members with a space therebetween are provided in a longitudinal direction of the elongated article. At least one of the elastic stop members has an end portion at a level different from those of the other elastic stop members.

With the structure described above, it is possible to hold a plurality of the elongated articles having different diameters. More specifically, the elastic stop member having the lower end located at a lower level toward the bottom of the insertion concave portion holds the elongated article having a smaller diameter. The elastic stop member having the lower end located at a higher level holds the elongated article having a larger diameter.

According to the sixth aspect of the invention, in the clamp for holding the elongated article according to any one of the first to fifth aspects, the space is formed of a notch portion provided at the joining portion of the upper end of the elastic stop member and the sidewall.

With the structure described above, the total length of the joining portion as a bending center of the elastic stop member along the longitudinal direction of the elongated article can be made shorter than that of the lower end of the elastic stop member along the longitudinal direction of the elongated article.

According to the seventh aspect of the invention, in the clamp for holding the elongated article according to any one of the first to fifth aspects, the space is formed at upper portions of a connection member connecting the lower ends of the elastic stop members.

With the structure described above, through the elastic stop members and the connection member, a total length of the joining portion as a bending center of the elastic stop members along the longitudinal direction of the elongated article can be made shorter than that of the lower ends of the elastic stop members along the longitudinal direction of the elongated article.

Especially, each of the elastic stop members can be bent independently. Thus, it is possible to reduce the force for inserting the elongated article into the insertion concave portion. At the same time, the connection member or the lower ends of the elastic stop members effectively prevent the elongated article from moving out.

DETAILED DESCRIPTION OF PREFERRED EMBODIMENTS

Hereunder, embodiments of the invention will be described with reference to the accompanying drawings.

According to the embodiment, a clamp K for holding an elongated article H includes at least one clamp portion 1 to hold the elongated article H having a linear shape, a bar shape or a pipe shape, at an intermediate portion of the article. The clamp portion 1 described above is formed of an insertion concave portion 2 for the elongated article H and elastic stop members 4.

The insertion concave portion 2 includes a pair of sidewalls 3 along a longitudinal direction of the elongated article H to be inserted therein. More specifically, in the insertion concave portion 2, an upper side between the pair of the sidewalls 3 is open, and one side of the pair of the sidewalls 3 and the other side of the pair of the sidewalls 3 are formed in a groove shape opened sideward. The elongated article H is inserted into the insertion concave portion 2 from the upper side of the pair of the sidewalls 3.

The elastic stop members 4 have upper ends integrally connected to an upper portion of at least one of the pair of the sidewalls 3 constituting the insertion concave portion 2. Each elastic stop member 4 projects obliquely downward toward a bottom of the insertion concave portion 2. In other words, the elastic stop member 4 is attached to the sidewall 3 so that the distance between the sidewall 3 and the elastic stop member 4 is gradually widened from the upper end to a lower end of the elastic stop member 4.

In the clamp portion 1, the lower ends 4a of the elastic stop members 4 hold the elongated article H with an elastic force at an insertion position under the lower ends 4a, when the elongated article H is inserted. In other words, as the elongated article H is inserted into the insertion concave portion 2, the elastic stop members 4 are pressed against the elongated article H to thereby bend toward the sidewall 3 to which the elastic stop members 4 are attached. The elongated article H is then inserted into a space between the lower ends 4a of the elastic stop members 4 and the bottom of the insertion concave portion 2 corresponding to a diameter of the elongated article H.

In the present embodiment, at least one space 7 is formed at a joining portion of the upper end of the elastic stop member 4 and the sidewall 3. With this space 7, a total length of a portion 6, which is a center of bending the elastic stop member 4, along the longitudinal direction of the elongated article H becomes shorter than a total length of the lower ends 4a of the elastic stop members 4 along the longitudinal direction of the elongated article H.

As a result, in the clamp K according to the embodiment, the elastic stop member 4 is easily bent when the elongated article H is inserted into the insertion concave portion 2. At the same time, in the state where the elongated article H is completely inserted and the elastic stop members 4 are repelled to hold the elongated article H at the lower ends 4a thereof, the lower ends 4a of the elastic stop members 4 contact the elongated article H at a long contact line. In other words, in the clamp K, when the elongated article H is inserted into the clamp portion 1, the insertion force is small. Once the elongated article H is held in the clamp portion 1, the holding force with respect to the elongated article H is large.

The space 7 may be formed of a notch at the joining portion 5 of the upper end of the elastic stop member 4 and the sidewall 3. In other words, with the notch, a total length of the portion 6, which is a central portion of bending the elastic stop member 4, along the longitudinal direction of the elongated article H becomes shorter than a total length of the lower ends 4a of the elastic stop members 4 along the longitudinal direction of the elongated article H.

The space 7 may be formed at upper portions of connection members connecting lower ends of more than two units constituting the elastic stop member 4.

In other words, with the more than two units constituting the elastic stop member 4 and the connection member, a total length of the portion 6, which is a central portion of bending the elastic stop member 4, along a longitudinal direction of the elongated article H becomes shorter than a total length of the lower ends 4a of the elastic stop members 4 along the longitudinal direction of the elongated article H.

Figure 14:
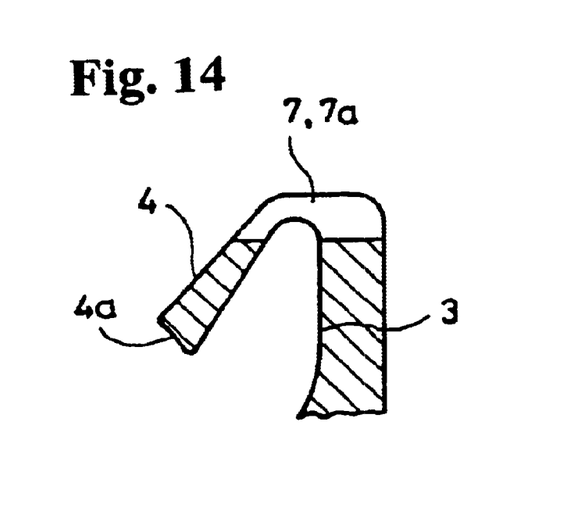
FIG. 14 is a sectional view of an essential part of a structure of the space.

As shown in FIG. 14, such a space 7 may be formed in a slot portion 7a extending between the upper end of the elastic stop member 4 and the upper portion of the sidewall 3 at the joining portion 5.

Figure 13:
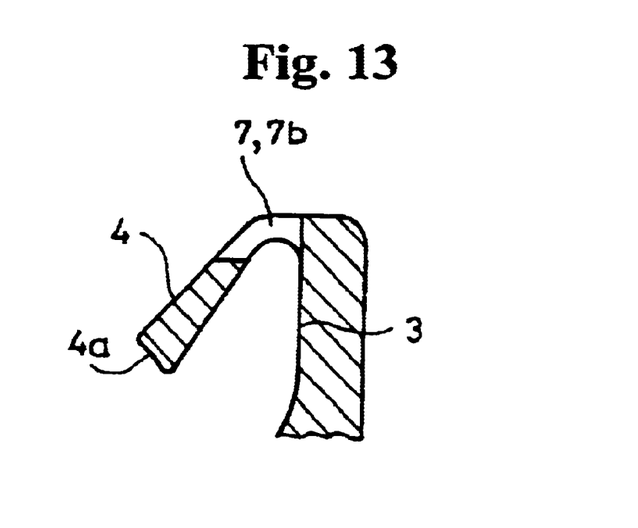
FIG. 13 is a sectional view of an essential part of a structure of a space.

As shown in FIG. 13, the space 7 is formed in a window hole portion 7b with a sidewall 3 as a window upper edge and having an opening at the upper end of the elastic stop member 4.

In the case that the space 7 is formed as shown in FIG. 13, the space 7 does not lower the rigidity of the sidewall 3. Thus, the clamp portion 1 easily holds the elongated article H with a large force.

When the space 7 has a longer length in the longitudinal direction of the elongated article H, or the number of the spaces 7 is increased, the total length of the portion 6, which is the center of bending the elastic stop member 4, in the longitudinal direction of the elongated article H becomes shorter relative to those of the lower ends 4a of the elastic stop members 4 in the longitudinal direction of the elongated article H.

FIGS. 1 to 7 show an example of the clamp K1 including the clamp portion 1. The clamp K1 according to the first embodiment includes one clamp portion 1. The elastic stop members 4 are provided in the pair of the sidewalls 3 constituting the insertion concave portion 2.

The elastic stop members 4 are provided along a direction extending from the sidewalls 3. The spaces 7 having a long hole shape are formed in the upper ends of the elastic stop members 4 along the direction extending from the sidewalls 3.

In the example, the spaces 7 are provided in the elastic stop members 4 disposed on one of the pair of the sidewalls 3 and the other of the pair of the sidewalls 3, respectively.

With this configuration, the elastic stop members 4 are easily bent due to the spaces 7 when the elongated article H is inserted into the insertion concave portion 2 to thereby lower the force of inserting the elongated article H. In a state where the elongated article H is completely inserted, the lower ends 4a of the elastic stop members 4 are pressed against the elongated article H, thereby securely holding the elongated article H in the insertion concave portion 2.

Figure 1:
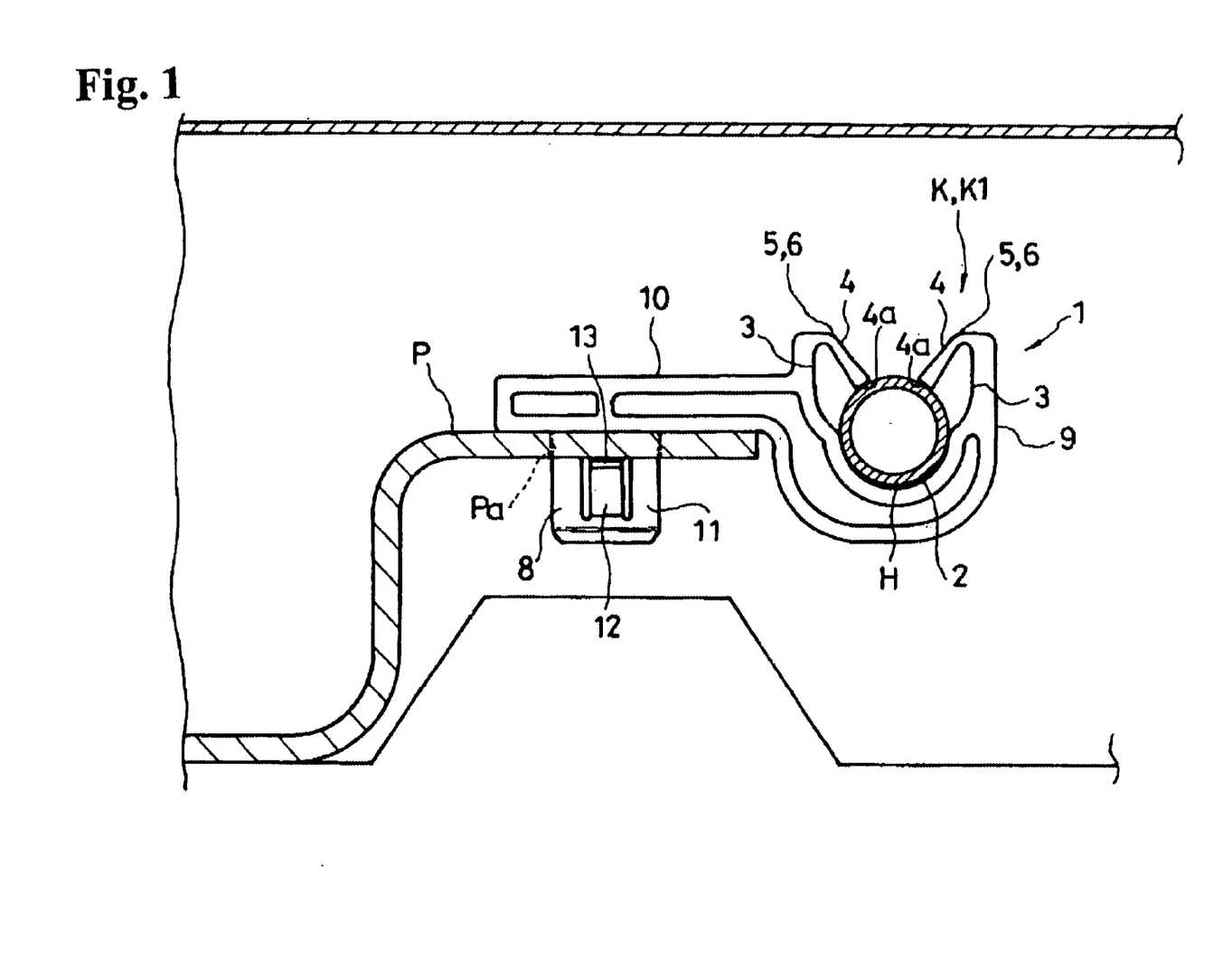
FIG. 1 is a side view showing a clamp K1 according to the first embodiment of the invention in a state where the clamp is used.
Figure 2:
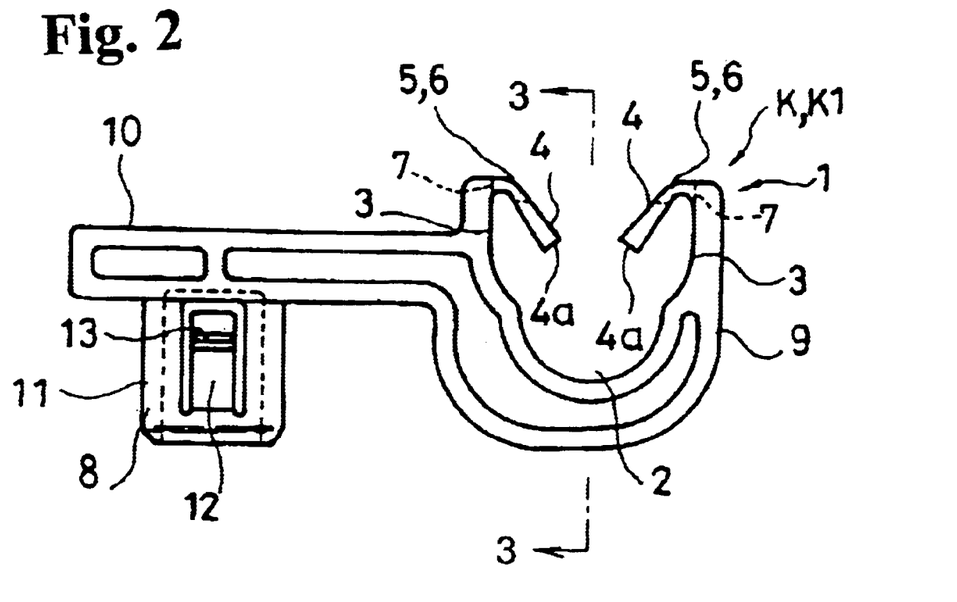
FIG. 2 is a side view of the clamp K1 of the first embodiment.
Figure 3:
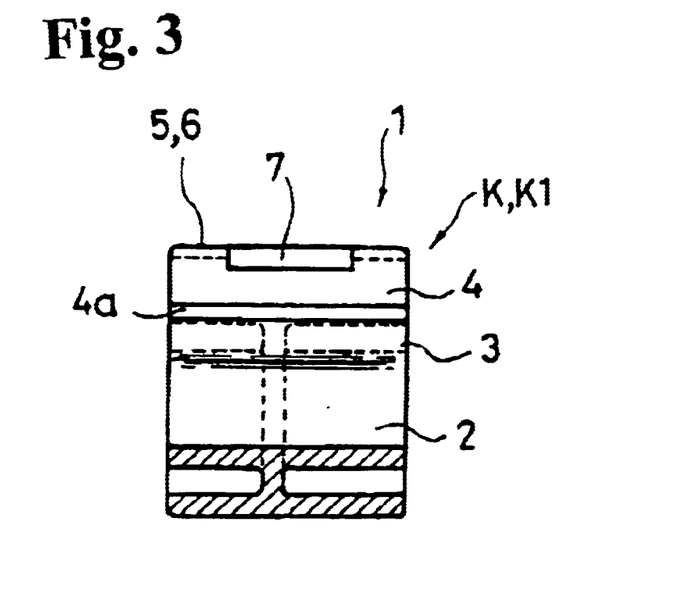
FIG. 3 is a sectional view taken along line 3—3 in FIG. 2.
Figure 4:
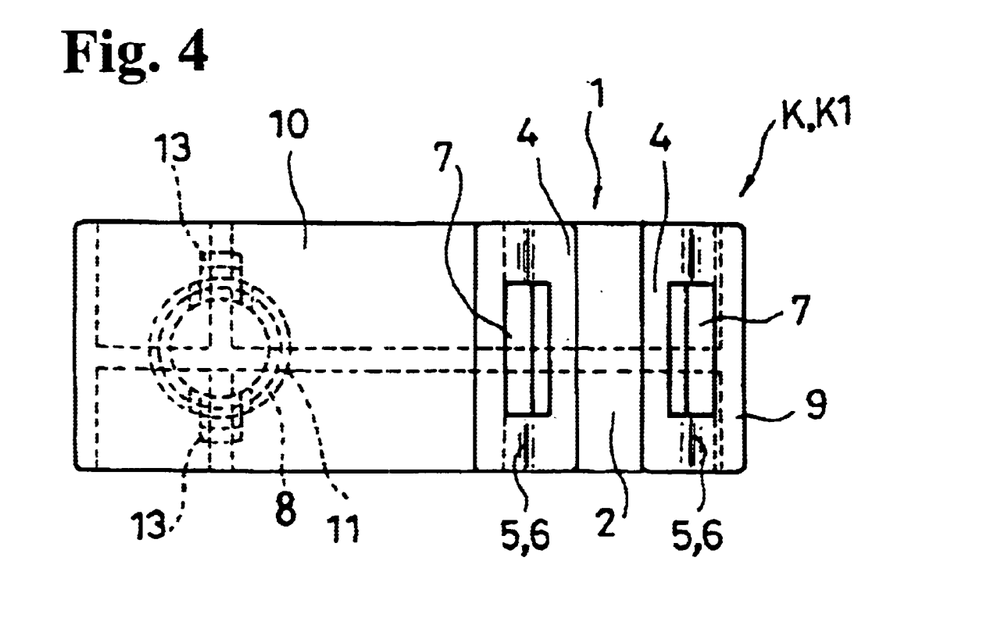
FIG. 4 is a plan view of the clamp K1 according to the first embodiment.
Figure 5:
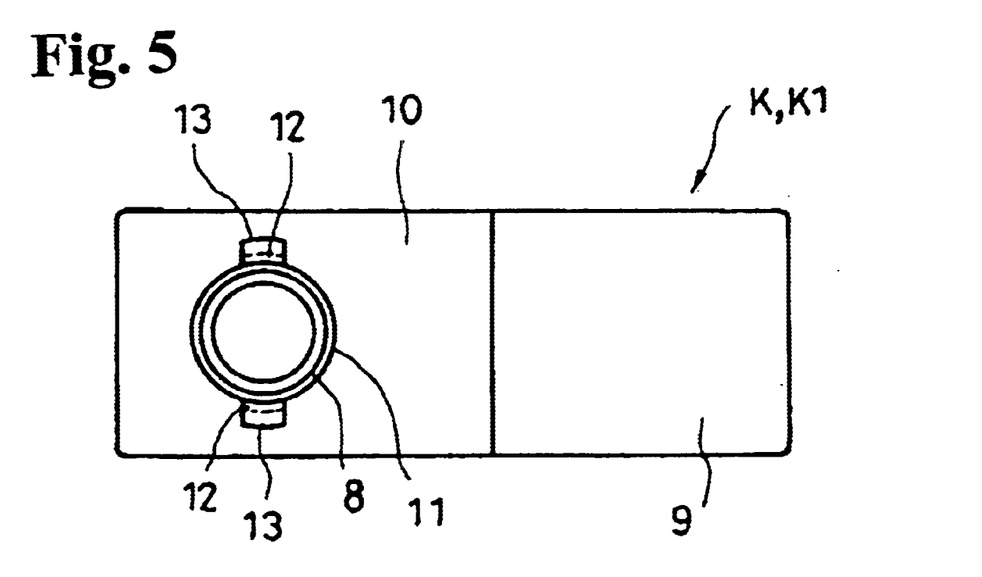
FIG. 5 is a bottom view of the clamp K1.
Figure 6:
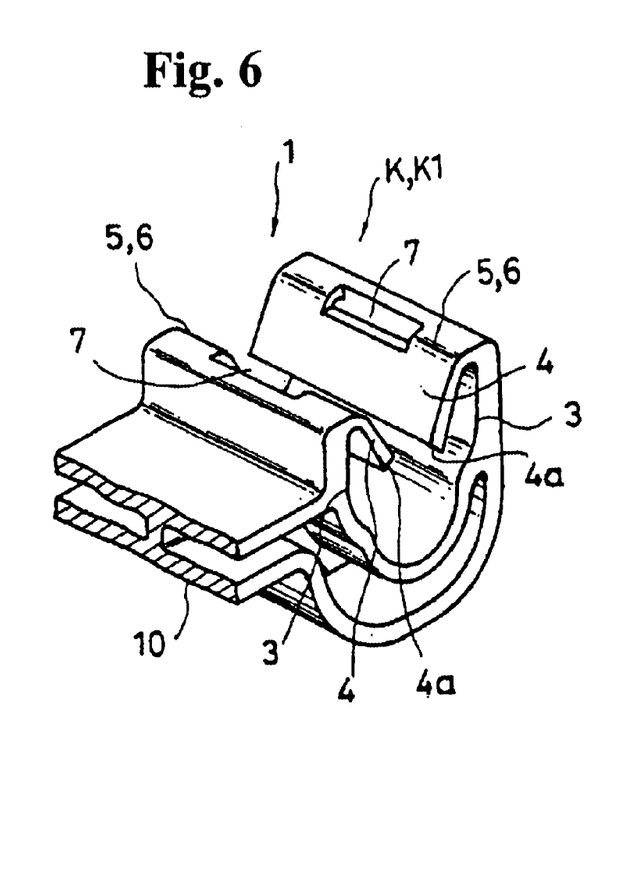
FIG. 6 is a perspective view of an essential part of the clamp K1.
Figure 7:
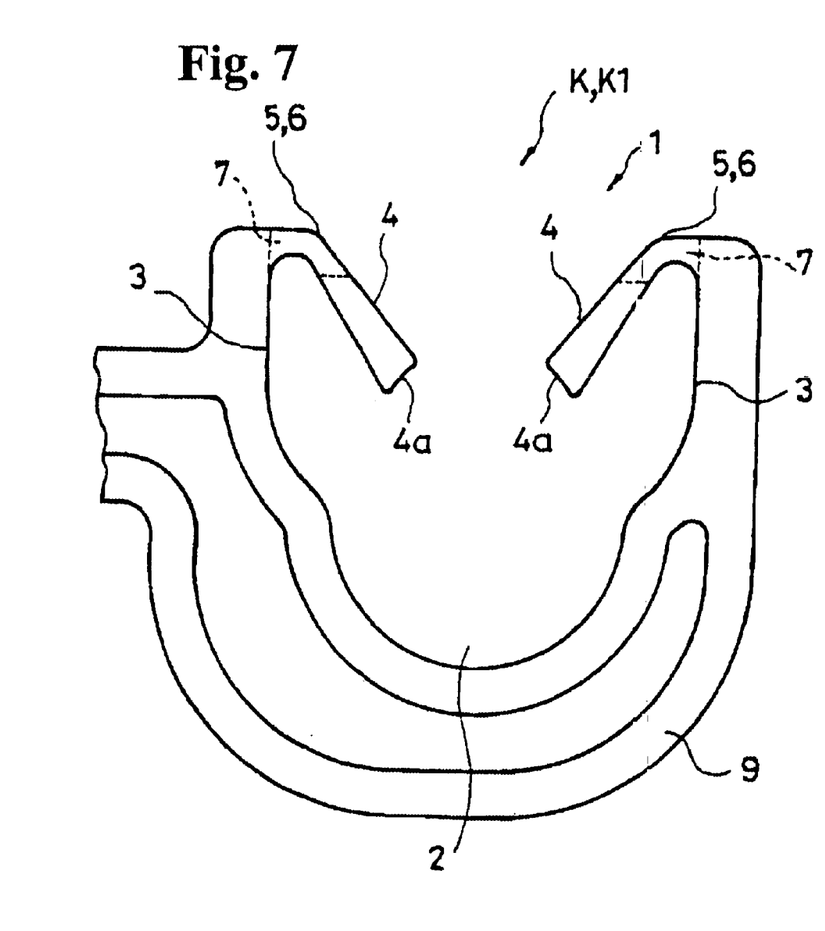
FIG. 7 is a side view of an essential part of the clamp K1.

Also, the clamp K1 according to the present embodiment includes an attaching portion 8 for attaching the elongated article H to an object P to be attached. While the clamp portion 1 holds the elongated article H, the clamp is attached to the object P to be attached through the attaching portion 8. Thus, in the present embodiment, the elongated article H can be held by the object P to be attached through the clamp K1.

In the present embodiment, the attaching portion 8 is provided on one side of a base plate 10 having one end integrally connected to a main portion 9 constituting the clamp portion 1.

In the present embodiment, the attaching portion 8 includes a cylindrical member 11 having one end integrally fixed to a surface of the base plate 10 opposite to an entrance of the insertion concave portion 2 and projecting from the surface of the base plate 10; elastic pieces 12 disposed at both sides in a radial direction of the cylindrical member 11 in a state that the elastic pieces can bend toward an inner direction of the cylindrical member 11 and having forward ends positioned on a base portion of the cylindrical member 11; and engaging projections 13 provided outside the forward ends of the elastic pieces 12.

In the present embodiment, an attaching hole Pa with a diameter slightly smaller than a distance between top ends of the engaging projections 13 of the elastic pieces 12 is formed on the object P to be attached. The elastic pieces 12 are bent inward as the cylindrical member 11 is inserted into the attaching hole Pa. Accordingly, the engaging projections 13 engage an edge of the attaching hole with an elastic force of the elastic pieces 12 in a state where the cylindrical member 11 enters the attaching hole Pa, thereby attaching the clamp K1 to the object P to be attached through one-step operation (see FIG. 1)

Figure 8:
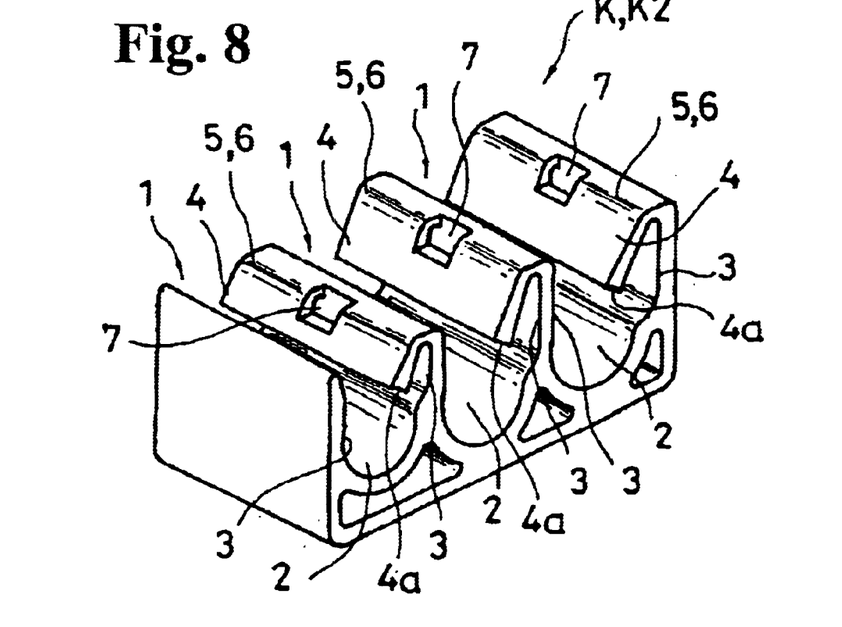
FIG. 8 is a perspective view showing a clamp K2 according to the second embodiment of the invention.

FIG. 8 is a view schematically showing another example, i.e. a clamp K2, including the clamp portions 1. The clamp K2 has more than two clamp portions 1. Also, the elastic stop members 4 are provided to one of the pair of the sidewalls 3 constituting the insertion concave portions 2. Each elastic stop member 4 is provided along the direction extending from the sidewall 3. The spaces 7 are formed in the upper ends of the elastic stop members 4, respectively.

Also, the clamp portions 1 are disposed in parallel. Specifically, the clamp portions 1 are provided so that the sidewalls 3 constituting the insertion concave portions 2 of the clamp portions 1 are arranged substantially in parallel with each other, thereby constituting the clamp K2 with more than two clamp portions 1.

Thus, in the present embodiment, more than two elongated articles H can be held by the clamp portions 1 and be bundled up through the clamp K2. Also, the elongated articles H to be bundled together can be disposed at their predetermined positions.

Figure 9:
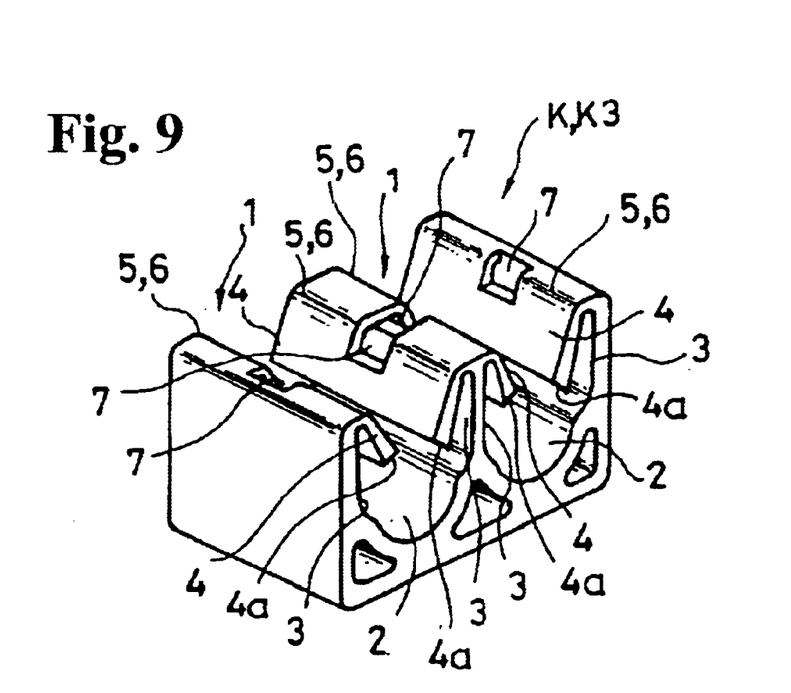
FIG. 9 is a perspective view showing a clamp K3 according to the third embodiment of the invention.

FIG. 9 is a view schematically showing another example, i.e. a clamp K3, including the clamp portions 1. The clamp K3 according to the embodiment may include more than two clamp portions 1. The elastic stop members 4 are provided to the pair of the sidewalls 3, 3 constituting the insertion concave portions 2, respectively.

Each elastic stop member 4 is provided along the direction extending from the sidewall 3. The space 7 is formed in the upper end of each elastic stop member 4. The clamp portions 1 are disposed in parallel.

Specifically, the clamp portions 1 are provided so that the sidewalls 3 constituting the insertion concave portions 2 of the clamp portions 1 are arranged substantially in parallel with each other, thereby constituting the clamp K3 having two clamp portions 1 in parallel.

Thus, in the present embodiment, two elongated articles H can be held by the clamp portions 1 and be bundled up through the clamp K3. Also, the elongated articles H bundled together can be disposed at their predetermined positions.

Figure 10:
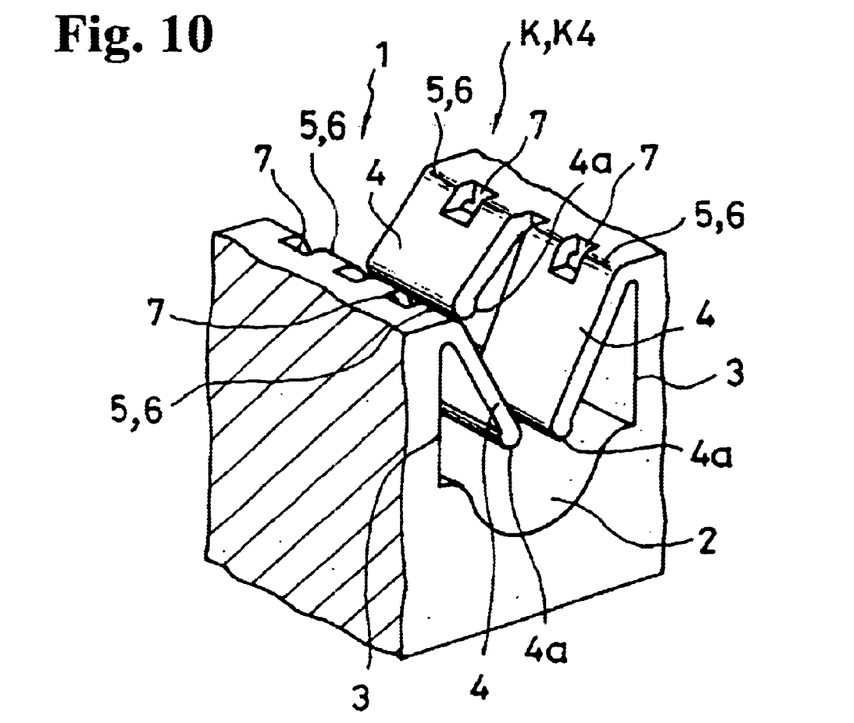
FIG. 10 is a perspective view of an essential part of a clamp K4 according to the fourth embodiment of the invention.
Figure 11:
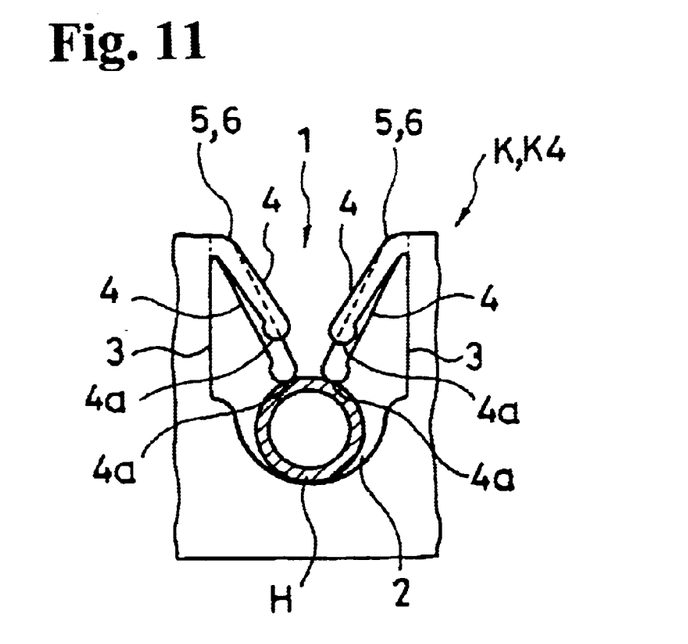
FIG. 11 is a side view showing the clamp K4 in a state where the clamp is used.
Figure 12:
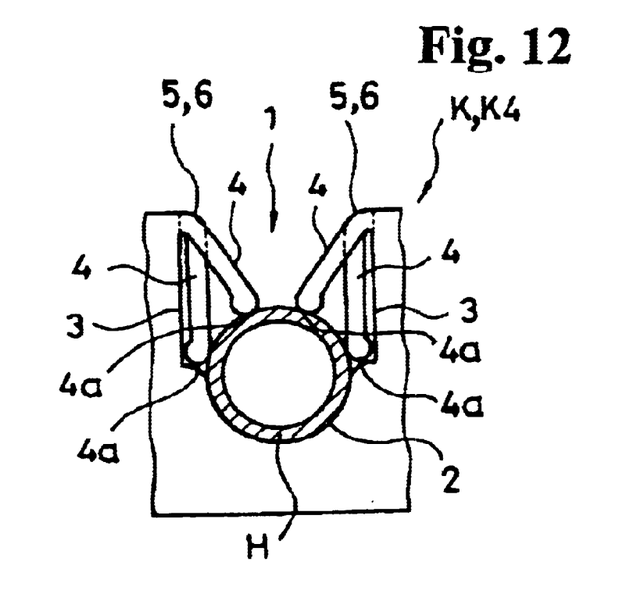
FIG. 12 is a side view showing the clamp K4 in a state where the clamp is used.

FIGS. 10 to 12 are views schematically showing another example, i.e. a clamp K4, including the clamp portion 1, and also showing a portion where the clamp portion 1 of the clamp K4 is provided.

In the clamp K4 according to the present embodiment, the clamp portion 1 is provided with more than two elastic stop members 4, with a space therebetween in the longitudinal direction of the elongated article H.

Specifically, in the present embodiment, two elastic stop members 4 are provided in each of the pair of the sidewalls 3 constituting the insertion concave portion 2 along the longitudinal direction of the elongated article H with a space therebetween.

The respective elastic stop members 4 are disposed along the direction extending from the sidewalls 3. The spaces 7 are formed in the upper ends of the respective elastic stop members 4.

Also, at least one set of the elastic stop members 4 has lower ends 4a situated at a level different from those of lower ends 44 of another set of the elastic stop members 4.

Specifically, as described above, the lower ends 4a of one set of the two elastic stop members 4 disposed at each of the pair of sidewalls 3 are spaced apart from the bottom of the insertion concave portion 2 for a distance different from a distance between the bottom of the insertion concave portion 2 and the lower ends 4a of another set of the two elastic stop members 4.

With this configuration, the elongated articles H having different diameters can be properly held. Specifically, the elastic stop members 4 having the lower ends 4a closer to the bottom of the insertion concave portion 2 can hold an elongated article H having a smaller diameter (see FIG. 11). The elastic stop members 4 having the lower ends 4a situated at a higher level can hold an elongated article H having a larger diameter (see FIG. 12). In this case, the elastic stop members 4 having the lower ends 4a situated at a lower level continue to be bent by a side surface of the elongated article H (see FIG. 12).

The clamps K1–K4 described above may be typically formed through injection molding, so that the elastic stop members 4 constituting the clamps K have elasticity.

According to the clamps of the present invention, the spaces are provided at the connecting portions between the elastic stop members and the sidewalls constituting the insertion concave portion for receiving the elongated article. Thus, the total length of the portion as the bending center of the elastic stop member can be reduced, thereby reducing the force for inserting the elongated article into the clamp portion as little as possible. Also, it is possible to maintain the large force for extracting the elongated article from the clamp portion without reducing the total length of the lower ends of the elastic stop members for holding the elongated article.

While the invention has been explained with reference to the specific embodiments of the invention, the explanation is illustrative and the invention is limited only by the appended claims.

What is claimed is:

1. A clamp for holding an elongated article, comprising:
   at least one clamp portion including an insertion concave portion having a pair of sidewalls for receiving the elongated article therein and a bottom; at least one elastic stop member having an upper end integrated with an upper portion of at least one of the pair of the sidewalls to form a bending portion, and a lower end, said at least one elastic stop member projecting diagonally downward toward the bottom of the insertion concave portion to form a holding space for holding the elongated article between the bottom and the lower end; and at least one space formed at the bending portion joining the upper end of the elastic stop member and the sidewall, said lower end having a length greater than that of the bending portion except for the at least one space formed therein to thereby reduce a bending strength of the at least one elastic stop member at the bending portion.

2. A clamp as claimed in claim 1, further comprising an attaching portion attached to the at least one clamp portion for attaching the clamp to an object to be attached.

3. A clamp as claimed in claim 1, further comprising a plurality of clamp portions which are fixed parallel to each other.

4. A clamp as claimed in claim 1, wherein said at least one elastic stop member is attached to each of said pair of the sidewalls, and said at least one space is formed at least at one of said bending portions joining the upper ends of the elastic stop members and the sidewalls.

5. A clamp as claimed in claim 1, wherein said at least one clamp portion includes a plurality of elastic stop members attached to at least one of the sidewalls with a space therebetween, the lower end of at least one of said plurality of elastic stop members having a level different from that of the other elastic stop member.

6. A clamp as claimed in claim 1, wherein said space is formed of a notch provided at the bending portion joining the upper end of the elastic stop member and the sidewall without extending to the lower end.

7. A clamp as claimed in claim 1, wherein said space has an elongated shape extending along the side walls so that the elastic stop member is connected to the side wall at two portions spaced apart from each other and has lower sections forming a connection portion of two sections of the elastic stop member.

8. A clamp as claimed in claim 1, wherein said at least one elastic stop member has a rigidity so that when the elongated article is inserted into the concave portion, the at least one elastic stop member bends at the bending portion and when the elongated article passes the at least one elastic stop member, the at least one elastic stop member returns to an original position to hold the elongated article in the concave portion.

9. A clamp as claimed in claim 1, wherein said at least one space is a hole completely surrounded by a periphery thereof.

* * * * *